(12) United States Patent
Baer et al.

(10) Patent No.: US 8,955,149 B1
(45) Date of Patent: Feb. 10, 2015

(54) IMPERSONATION AUTHORIZATIONS

(75) Inventors: Graeme D. Baer, Seattle, WA (US); Gregory B. Roth, Seattle, WA (US); Eric J. Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 13/312,379

(22) Filed: Dec. 6, 2011

(51) Int. Cl.
*G06F 17/30* (2006.01)
*G06F 7/04* (2006.01)
*H04N 7/16* (2011.01)
*G06F 11/30* (2006.01)
*G06F 15/16* (2006.01)

(52) U.S. Cl.
USPC ............... 726/28; 726/27; 713/187; 709/229

(58) Field of Classification Search
USPC .................. 726/26–28; 713/187; 709/229
See application file for complete search history.

(56) References Cited

U.S. PATENT DOCUMENTS

| 7,117,529 B1* | 10/2006 | O'Donnell et al. ............... 726/6 |
| 2007/0089167 A1* | 4/2007 | Villavicencio ..................... 726/5 |
| 2008/0133551 A1* | 6/2008 | Wensley et al. .............. 707/100 |
| 2012/0066755 A1* | 3/2012 | Peddada et al. ................... 726/8 |
| 2012/0096521 A1* | 4/2012 | Peddada ........................... 726/4 |

* cited by examiner

*Primary Examiner* — Evans Desrosiers
(74) *Attorney, Agent, or Firm* — Thomas | Horstemeyer, LLP

(57) ABSTRACT

Disclosed are various embodiments for granting permission to another user on a computer network to impersonate himself or herself on the network for duration of a specified period. One embodiment of such a method describes receiving instructions from a second user to grant impersonation permission to a first user to have access to user data of the second user; establishing an access policy authorizing access to the user data of the second user; and assigning the access policy to the first user.

23 Claims, 16 Drawing Sheets

| GRANTEE | GRANTOR | ... |
|---|---|---|
| GROUP1 | USER2 | |
| USER1 | USER3 | |
| BOB'S TECH SUPPORT | USER4 | |
| SP TECH SUPPORT | USER4 | |
| ADMIN | USER4 | |
| ... | ... | |

IMPERSONATION AUTHORIZATIONS

BACKGROUND

In computer technical and customer support, it is often useful to reproduce a problem that is being experienced by a user in order to troubleshoot or resolve the problem. For example, a technical support representative may recreate the problem on the support representative's own computer by logging into the user account of the user experiencing the problem using the user's own credentials (e.g., username and/or password).

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 is a drawing of a table that specifies access rights associated with entities that have been granted permission rights according to various embodiments of the present disclosure.

DETAILED DESCRIPTION

Techniques are described that facilitate a user granting permission to another user to impersonate the user while interacting with a network-based resource for a specified period. For example, in the context of a network-based resource such as an e-commerce web server or a computing service, in order for a customer service or technical support representative to identify a problem the user is experiencing, it is desirable for the network-based resource to function in the same manner regardless of whether the user or the technical support representative is interacting with it. Accordingly, embodiments of the present disclosure allow for the user to grant a permission allowing the support representative to impersonate the user for a specified period while interacting with the network-based resource to attempt to recreate the problem for his or her own viewing.

Figure 1:
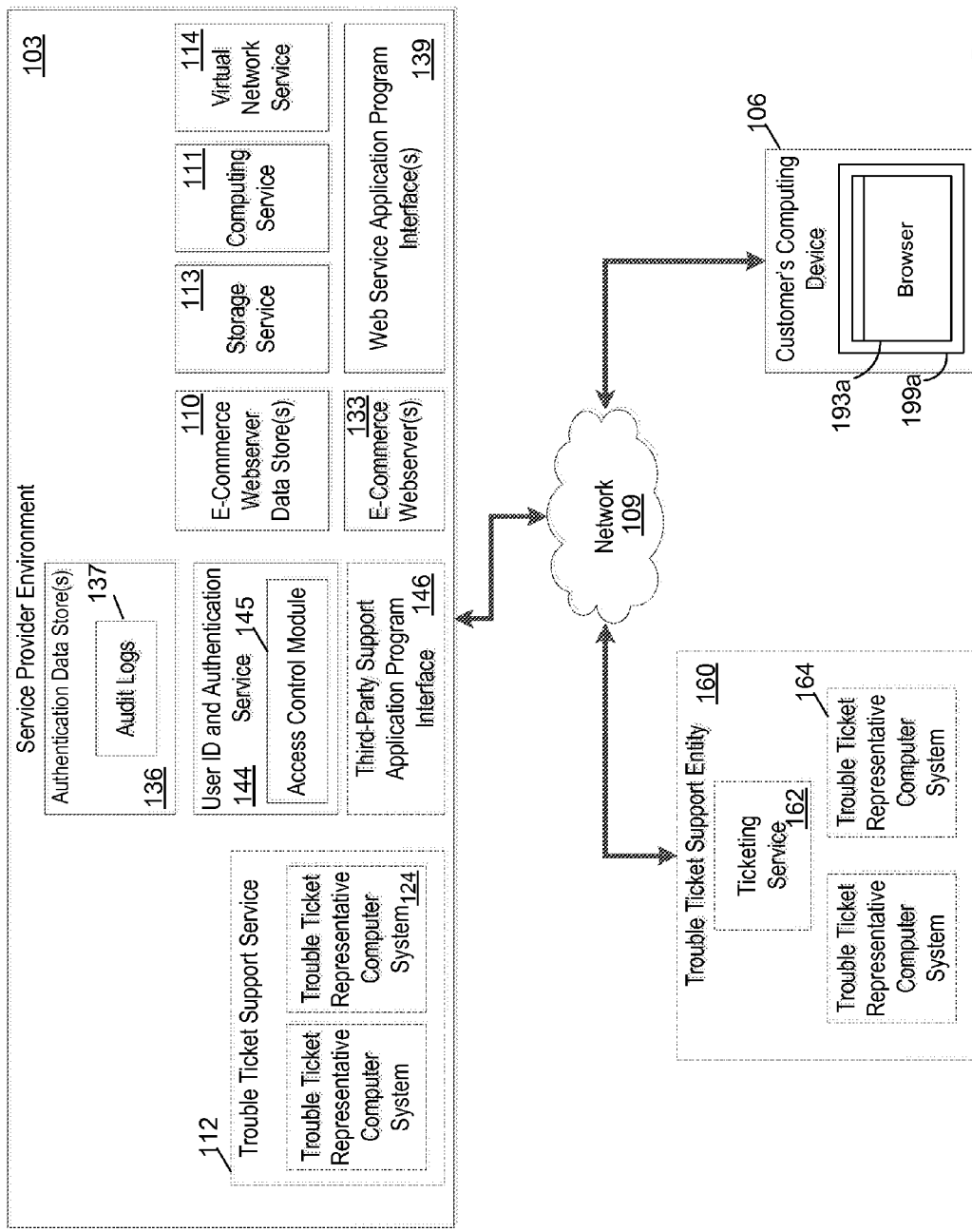
FIG. 1 is a drawing of a data communications network environment according to various embodiments of the present disclosure.

In the following discussion, a general description of a permission grant system and its components is provided, followed by a discussion of the operation of the same. With reference to FIG. 1, shown are a service provider environment 103, one or more clients 106, and a network 109 within a data communications network environment. The network 109 includes, for example, the Internet, intranets, extranets, wide area networks (WANs), local area networks (LANs), wired networks, wireless networks, or other suitable networks, etc., or any combination of two or more such networks.

The service provider environment 103 may further include computer systems configured to effectuate network-based resources such as an e-commerce web server 110, a computing service 111, a storage service 113, a virtual network service 114, etc. All of these services may be effectuated by one or more computer systems similar to the computer device shown by FIG. 16. The network-based resources can connect to an internal network that in turn connects to network 109. In one embodiment, the virtual network service 114 can be effectuated by a plurality of computer systems that are configured to generate and control one or more virtual networks for one or more customers by overlaying each virtual network upon a distinct substrate network.

In an example embodiment, the service provider can operate a virtual network on behalf of a customer. For example, in response to application program interface calls from a customer, the virtual network service 114 can attach one or more computing resources (e.g., one or more virtual machines or physical computer systems) to a customer's virtual network and assign each computing resources IP (Internet Protocol) addresses in the range used by the customer's private internal network. In this way, users within the customer's internal network can access resources within the virtual network as if the resources were local to the customer.

To set up a virtual network, a site-to-site virtual private network (VPN) connection can be used to connect the customer's environment to an edge server operated by the service provider (not illustrated). The customer can instantiate one or more virtual machines (that in turn run the customer's programs) and assign them IP addresses on the virtual network via one or more application program interface calls. When a packet addressed to a customer's virtual machine is received over the VPN, the edge server uses routing information to route the packet to a host computer running the virtual machine. The host computer changes the headers of the packet to make it appear as if it came from an IP address of the customer's internal network and sends it to the virtual machine. The virtual network can be considered to be "overlaid" on a substrate network because the virtual machines within the virtual network use IP addresses in a different subnet than the IP addresses used within the service provider's subnet.

In FIG. 1, the service provider environment 103 may comprise, for example, a plurality of server computers or any other computing devices or systems providing computing capability. As such, the service provider environment 103 may include multiple computer systems arranged, for example, in one or more server banks or other arrangements. Such computer systems may be located in a single installation or may be dispersed among many different geographical locations. In one embodiment, the service provider environment 103 can include computer systems configured to effectuate an e-commerce web server 133. Further, in one embodiment, the service provider environment 103 includes one or more computer systems configured to effectuate a user identification and authentication service 144, which can be used to authenticate a user that attempts to log into network-based resources provided by the service provider to access information from his or her account or to access applications or data that is attached to or associated with the authenticated user. Other uses of the computer systems operated by the service provider environment 103 are also possible, including multitenant cloud computing. Accordingly, embodiments of the present disclosure allow for a first user of a network accessible computing service or environment to be impersonated by another user acting on behalf of the first user.

Various applications and/or other functionality may be executed by computer systems operating within the service provider environment 103 according to various embodiments. Also, various data is stored in data store(s) 110, 136 and is accessible to computer systems within the service provider environment 103. The data stored in the data store (s), for example, is associated with the operation of the various applications and/or functional entities described below.

In a specific example, the service provider environment 103 and data store(s) 110, 136 may span one or more data centers. In one embodiment, the computer systems spanning the one or more data centers together can effectuate an online marketplace that allows users to sell and buy goods, services, or products.

The data store(s) 110, 136 maintain, for example, user data, network accessible content, policies and permissions, and potentially other data. The user data is data associated with a user and also includes profile data. In this context, a user refers to a party that uses the functionality of a computing service 111 and may include users that sell or offer items for sale to prospective buyers and/or a party that buys an item offered for sale within the marketplace, whether a retail product or a service, such as a network hosting service. However, the user may or may not have ownership or control of the service provider environment 103. In other contexts, a user may have a different connotation such as referring to a user of a network service, a user of a particular computer application, etc.

The profile data 153 includes a variety of information regarding the identity of the user, such as a user name, contact information, bank account information, and/or other data relevant to the identity of the user. When the user is a company, the profile data 153 may include a company name, a state of incorporation, a name of a company representative, and/or other data relevant to the identity of the company. The contact information may include a mailing address, an email address, a telephone number, a fax number, or other contact information. Also, the bank account information may include a bank name, a routing number, and an account number in order to facilitate payment and deposit transactions.

The data store(s) 110 may further store network accessible content associated with various aspects of providing information to and gathering data from a user of the functionality of the e-commerce web server 133 and therefore may be referred as an e-commerce web server data store. Also, the data store (s) 136, such as an authentication data store, may store user policies. For example, when a permission is needed to be added to a user or group of users, a policy may be defined (in the access policy language) that contains the permission and then associated with the user or group. In addition, data store (s) 136 store logs or audit reports generated when individuals interface with the cloud or virtual services, in one embodiment. For example, the logs identify when a virtual machine is started or stopped; when a customer's data store is accessed; when changes to an account are made; when a computing resource is added to a virtual network; when routing information for a virtual network is updated; etc.

The computer systems operating within the service provider environment 103 can, for example, effectuate an e-commerce web server 133, as well as other applications, services, processes, engines, or functionality not discussed in detail herein. The e-commerce web server 133 facilitates the online selling and purchasing of items over the network 109. The e-commerce web server 133 also interacts with computer systems effectuating backend functions associated with the online presence of a user in order to facilitate the hosting of or providing of network content for the user. Additionally, in one embodiment, the e-commerce web server 133 generates or encodes for display item detail pages, such as web pages or other types of network content that are provided to clients 106 for the purposes of selecting items for purchase, rental, download, lease, or other forms of consumption.

The service provider environment 103 may further include a trouble ticket service or system 112. In one embodiment, the trouble ticket service 112 maintains list of issues encountered in the service provider environment 103 for one or more components. According to various embodiments, the trouble ticket service 162 may be provided by the service provider or by a third-party consulting entity that is not the hosting provider, such as third-party support entity 160. The trouble ticket service 112, 162 can create, update, and resolve reported customer or end-user issues. In this process, the trouble ticket service 112, 162 can issue a trouble ticket which is a data record which contains information about support interventions made by technical support staff or third parties on behalf of an end-user who has reported an incident.

Each of the clients 106 is coupled to the network 109. Also, each of the clients 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. To this end, each of the clients 106 may comprise a mobile device as can be appreciated. Each of the clients 106 may include, for example, various peripheral devices. In particular, the peripheral devices may include input devices such as, for example, a keyboard, keypad, touch pad, touch screen, microphone, scanner, mouse, joystick, or one or more push buttons, etc. The peripheral devices may also include display devices 199a, 199b, indicator lights, speakers, etc. Specific display devices 199a, 199b may be, for example, cathode ray tubes (CRTs), liquid crystal display (LCD) screens, gas plasma-based flat panel displays, LCD projectors, or other types of display devices, etc.

Executed within the clients 106 are various applications including a browser 193. The client browser 193 is configured to interact with the web service application program interface 139 according to an appropriate protocol (e.g., TCP/IP). The client browser 193 may be executed in the client 106 for example, to access and render network accessible content, such as web pages, or other network content served up by the servers utilized within the service provider environment 103. The client 106 may be configured to execute applications beyond the client browser 193, such as, for example, email applications, instant message applications, and/or other applications, including dedicated client-side applications.

When executed in a client 106, the respective browser 193 renders a respective user interface on a respective display device 199 and may perform other functions. The client browser 193 accesses network accessible content such as web pages or other types of content from a service provider device, such as e-commerce web server 133, in order to access the functionality of the e-commerce web server 133 and other components implemented in the service provider environment 103 as will be described.

Users may not all have the same access rights within the service provider environment 103. Accordingly, particular access rights are attached to or assigned to particular users that define what services and resources a user is entitled to access. In order to ensure that user data is secure and only accessible to authorized individuals, user identification and authentication service 144 provides functionality for authenticating users as they attempt to access resources within the service provider environment 103, including computing service 111 and to data maintained or stored on data store(s) 136. In particular, user identification and authentication service 144 verifies credentials for users that are attempting access resources within the service provider environment 103, and allows or denies access accordingly to access rights attached to an authenticated user. Such credentials may include user logins, authentication requests signed by customer keys, passwords, biometric data, IP address verification, and the like, or any combination thereof. In one embodiment, user identification and authentication service 144 defines access rights for users (e.g., impersonation rights, right to access another user's data, etc.). In response to a user request for access, user identification and authentication service 144 consults access control module 145 to determine what level of access is appropriate for the user making the request.

In order to authorize a user's request, permissions are granted by attaching a policy to the user or adding the user to a group that has the desired permission (e.g., a policy stating the underlying permission is associated with the group). A policy, e.g., a file, can formally state one or more permissions. To give a particular user a permission, a policy can be written according to an access policy language and attached to the user or group of users to which it applies. The act of attaching the policy to the user grants the user the permission stated in the policy. More than one policy can be attached to a particular user or group of users.

In an example embodiment, a policy may be added to a customer service support group allowing the group to impersonate a particular user such that a technical support representative within the group can be allowed or authorized to impersonate the particular user. Further, if the policy is removed or deleted from the group, then the technical support representative will no longer have necessary permission authorizing the representative to impersonate the particular user.

In one embodiment, a technical support representative may not be provided a new authentication credential (e.g., username, token, password, etc.) in order to impersonate the user. Instead, the technical support representative may utilize his or her standard credentials (e.g., username, token, password, etc.) to log into a service or website (e.g., a website provided by the e-commerce web server 133) to provide technical support. Since the technical support representative has been granted a new permission by the user (as evinced by the corresponding policy attached to the user), the technical support representative is allowed to impersonate the user in accordance with the policy. In an embodiment, the policy may specify that the technical support representative is allowed to impersonate the user for a specified duration and/or until a predetermined condition is satisfied. In one embodiment, the specified duration is designated by the user when the permission is granted or thereafter. In the same or an alternative embodiment, the predetermined condition is tied to an event, such as closing of a trouble ticket for a task being handled by the technical support representative.

Accordingly, in some embodiments, a granted permission may be automatically revoked or withdrawn upon occurrence of a stated or defined condition. Possible stated conditions may include, but are not limited to including one or more of surpassing a maximum amount of impersonation uses, expiration of a time limit in which to use the access policy authorizing impersonation, a resolution of an outstanding issue that a user requested a technical support representative to address, completion of a repair of a network outage problem, surpassing a maximum number of access failures by the technical support representative or entity, or occurrence of a technical support representative being off-duty in accordance with the representative's work schedule.

Further, in various embodiments, impersonation rights may be limited in scope. For example, the technical support representative may be granted an impersonation right with respect to certain operations and not granted with respect to other operations. In one embodiment, the technical support representative may be granted read permission to the user's data but not granted write permission. A user, such as a customer, may also choose whether to grant the technical support representative full or limited impersonation rights, in one embodiment. Also, impersonation rights may be granted to an intermediate entity, such as a customer support management member or principal, that can delegate the granted impersonation right to an individual technical support representative or a plurality or team of representatives. In this scenario, the intermediate entity may be able to choose whether to further limit the scope of the rights granted by the customer when granting rights to an individual technical support representative. Also, in one embodiment, the trouble ticket computer service or system 162 may act as the intermediate entity and be configured to select a technical support representative that is currently scheduled to be available to handle a service call/request and delegate the granted impersonation right(s) to the selected representative. By allowing for this type of delegation, the user does not have to reconfigure permission grants every time a support representative needs to be reassigned (e.g., a representative goes off-clock and another representative goes on-clock).

In one embodiment, each user will probably have multiple policies that apply to them. For example, Tina could have policies attached directly to her, and other policies attached to the groups she is a member. The access control module 145 evaluates all of the relevant policies at request time to determine whether Tina can perform a certain action, under what conditions, and on what resources. In the case of impersonation, one of the policies attached to Tina may be a permission to impersonate another user, Sophia. In one embodiment, Tina may therefore request to access configuration information for a virtual network associated with Sophia's account, a computing resource attached to the virtual network, an application or data associated with Sophia's account, perform a particular operation, etc. on behalf of Sophia. The access control module 145 may then verify (after Tina has been authenticated) whether Tina has the appropriate access policy authorizing her to operate the application or data on behalf of Sophia (i.e., impersonation). Also, after a positive verification, the client device of Tina may request actions to be performed on behalf of Sophia. In such an embodiment, instead of providing a request and a cookie identifying the user as Tina (via her username), the accompanying cookie may identify the user as Tina acting on behalf of Sophia (via their respective usernames). As a result, an audit log 137 documenting requested actions may also identify that the corresponding action was requested by Tina acting on behalf of Sophia (or something similar, such as Tina impersonating Sophia, etc.).

The present disclosure provides a scheme for granting permission to a user, such as a customer service or technical support representative, allowing the user to impersonate another user. Accordingly, the technical support representative utilizes a support representative's computer 124, 164, such as a personal computer running an operating system and one or more software applications. In one embodiment, computer 124, 164 includes the same client components as client computer 106, for accessing computing resources offered by computer systems running in the service provider environment 103. In another embodiment, computer 124, 164 includes a superset of the client components, or an enhanced version of such components, so as to enable the support representative to perform diagnostic and troubleshooting functions with respect to a networked-based resource. By running client components that are identical to or related to those components being run at client 106 allows a support representative to duplicate the user's experience and application interaction and thereby more easily identify and diagnose problems.

Support representative's computer 124, 164 interacts with user identification and authentication service 144 and other computing services 110 via network 109, in a manner similar to analogous interactions for client 106. To the extent possible within the framework of a technical support environment, support representative's computer's 124, 164 interactions with server components are designed to be substantially identical to those of user's client computer 106, so that the support representative can better diagnose problems. However, in some embodiments, additional functionality is provided for use by support representative on support representative's computer 124, 164 that may not be available on user's or customer's client 106.

In one embodiment, support representative's computer 124 may be connected to user identification and authentication service 144 and computing service 110 via a network other than network 109. In particular, client support representative's computer 124 may be connected via a secure network to which client 106 does not have access, such as an internal corporate network. Such an arrangement may enhance security, and may ensure that some functions (such as the ability to sign on as another user) are only accessible to support representative's computer 124 connected to the secure network.

In one embodiment, user identification and authentication service 144 controls support representative's access and communicates with network-based resources operated by the service provider, such as the e-commerce web server 133, in such a manner that, the support representative is authorized to submit requests on behalf of the user to the network-based resource. The network-based resource, however, can keep track of the interactions that were performed by the actual user and those performed by the support representative acting on behalf of the actual user in an audit log 137. In one embodiment, the actual user may be provided access to the audit log 137 so that the user can see what actions were performed while the user was being impersonated. For example, a service operated by the service provider could gather logs and expose them via an application program interface call over a network.

As an example, a customer at a client computing device 106 may be experiencing a problem with her virtual shopping cart generated by an e-commerce web server 133. In this example, suppose that the customer believes that a current promotion offering free shipping for items totaling over $25 is not being recognized by the service and calls a customer service support representative for assistance. In addition, suppose that the representative is not able to reproduce the same error using the representative's software tools. Accordingly, the representative asks the customer, if he may impersonate the customer to see exactly what the customer is seeing and help resolve the problem. Therefore, before being able to impersonate the customer, the customer must grant the representative permission to impersonate the customer. After the permission is granted, the representative is then allowed to impersonate the customer (subject to the same access policy rights and restrictions as that customer) to reproduce the condition being described or to see what is currently being displayed on a current page being accessed, such as the customer's pending cart, as it presently stands. For instance, the representative could receive a browser cookie or the like that includes information that allows the representative to impersonate the customer, e.g., a cookie that includes a session identifier for the customer. The representative could submit the cookie to the service and the browser 193 could receive a web page that is the same or similar to the one the customer is viewing. In this example, the representative could view the customer's cart and determine that the promotion is being applied but that the customer is overlooking it. Alternatively, the representative may determine that some items in the customer's cart are not available to be used with the promotion and that is the reason why the promotion is not being applied.

Figure 2:
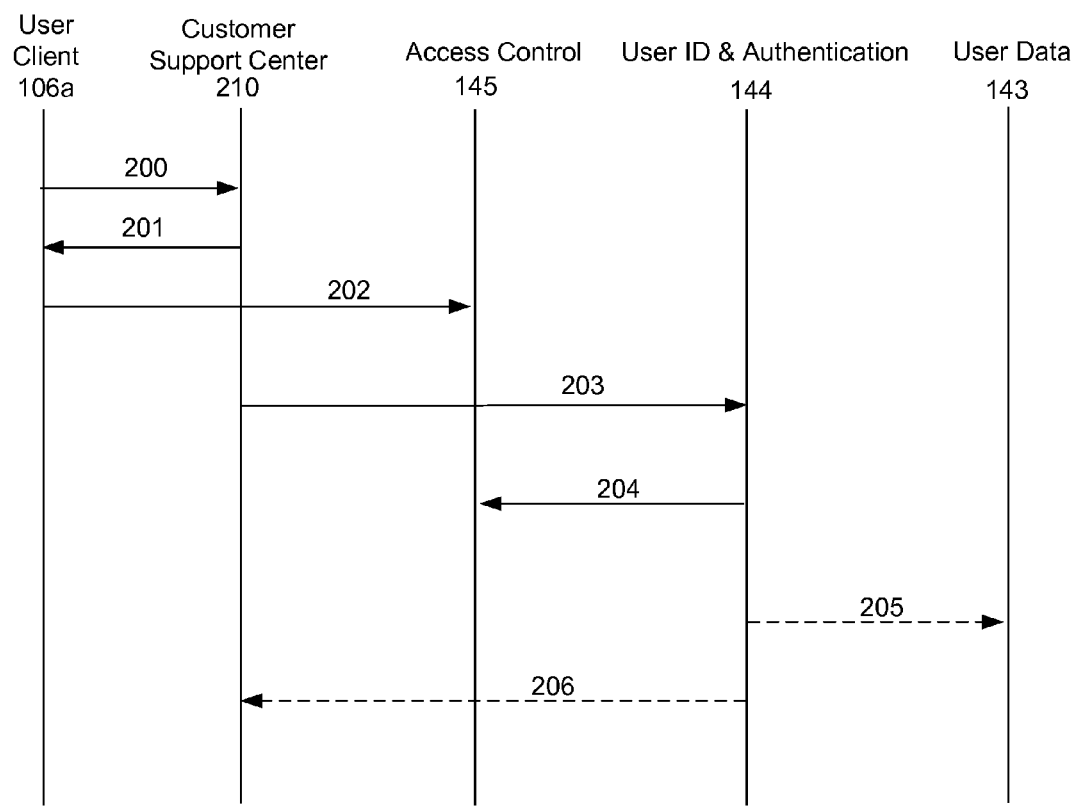
FIG. 2 is a drawing of an event diagram depicting an embodiment of a method of the present disclosure according to various embodiments of the present disclosure.

Referring now to FIG. 2, shown is an event diagram depicting an embodiment of a method of the present disclosure according to one embodiment. The method shown assumes that a user is running a browser 193 or other client (FIG. 1) via his or her client computer 106 over network 109 (FIG. 1), to access and interact with user data and network-based resource. The user has authenticated himself or herself via entry of a login identifier and password to user identification and authentication service 144. The user encounters some problem in attempting to perform a function on network-based resource, and contacts 200 a customer support center 210 for help. Correspondingly, in one embodiment, a support representative answers the call and greets the user. As such, the support representative may be also running a browser 193 or other client application via his or her support representative's computer's 124, 164 over the network 109.

Different communication techniques are within the scope of the present disclosure. For example, the communication between the user and the support representative can take place via any communication medium, including telephone, email, instant messaging, pager, web page(s), interactive web session, text messaging, Internet communications, and the like. In the course of describing the problem to the support representative, the support representative may wish to see what is going on, in particular with the user's own data and requests 201 for permission to access the user data. In order to allow the support representative to duplicate the problem on the support representative's computer 124, 164, the user grants 202 permission to the support representative to impersonate the user for a defined period, whereby authorization is provided to the access control module 145 to add a policy indicating that the support representative is allowed to access the user data. The user may grant permission to an intermediate entity that can delegate the permission to another user or to a group of users. As discussed below, the user may be redirected from a customer support center website to a website of a provider of the network-based resource (e.g., e-commerce web server 133) in order to grant the permission.

Also, in one embodiment, the technical support representative may be affiliated with a host provider of the network 109 and/or network-based resource. Alternatively, the technical support representative may be affiliated with a third-party consulting entity 160 that is not the host provider. In one such embodiment, the user grants permission to the third-party support representative to impersonate the user, as described above, where the host provider is informed by the user of the permission grant and a policy may be associated with the representative to allow him or her to access the user's data on behalf of the user. Therefore, when the third-party support representative attempts to impersonate the user while interacting with a storage service 113, a computer service 110, or a virtual network service 114, the representative will be allowed to impersonate the user.

In this particular scenario, a trouble-ticket may be opened for the user at a third-party trouble-ticket system of the customer support center 210, where the process of opening the ticket may cause a web browser of the user to be redirected to the service provider environment 103, where the user is prompted to grant the third-party trouble ticket service 162 or its representative permission to impersonate the user. After the permission is selected to be granted, then the user may be redirected back to the third-party trouble ticket system 162. Alternatively, the user may visit the service provider environment 103 to grant the permission before opening the trouble-ticket at the third-party trouble ticket service 162.

An exemplary operational flow in the instance where support is performed by a third party is as follows. For one embodiment, a user calls support or opens a trouble ticket (e.g., by pressing a button on an applicable web page). The request to open a trouble ticket is routed to the ticketing service 162 and it opens a ticket. A trouble ticket representative is assigned by the ticketing service 162 and the representative logs into the ticketing service 162 to help the user. At some point during the conversation, the trouble ticket representative determines to impersonate the user and submits a request to the ticketing service 162.

In one embodiment, the ticketing service 162 calls a third-party support application programming interface (API) 146 to authenticate the user. Access control module 145 determines whether impersonation of the user is allowed based on policy. This may also involve a call out to the user to authorize. Assuming impersonation is enabled, the access control module 145 generates a session browser token that allows the representative to go to access the e-commerce web server content and see what the user is seeing. This cookie may have a short expiration date. For example, when the e-commerce web server 133 gets the HTTP request a copy of the cookie is provided that attests that the trouble ticket representative is impersonating the user.

In the following illustrative example, suppose that a computing resource service customer has a problem. Also suppose that this customer has enabled an access policy with the service provider environment 103 that indicates that a third-party trouble ticket service 162 can support the user and the third-party trouble ticket service 162 has created a support account with the service provider environment 103.

In this example, the user goes to the website of the trouble ticket support entity 160 and opens a trouble ticket. The trouble ticket support entity 160 creates a ticket number and provides it to the user. Optionally the user could be redirected back to the service provider environment 103 to give the service provider the ticket number and to authorize the trouble ticket support entity 160 to help with the problem.

The ticketing service 162 assigns the ticket to a representative. The representative logs into the ticketing service 162 to help solve the problem. The ticketing service 162 sends a call to impersonate the user to the service provider environment 103 along with an identifier (e.g., ID) of the trouble ticket representative that will do the work. In the instance that the user was not redirected to the service provider environment 103 to give it the trouble ticket number, the service provider environment 103 could push a prompt to the user to ask them to authorize the impersonation request. An optional configuration involves the ticketing service 162 querying the access control module 145 to scope the trouble ticket representative's rights. For example, the ticketing service 162 may request that the impersonation only last for the next 4 hours (e.g., the length of time left in the trouble ticket representative's shift). Assuming that the impersonation request succeeds, the service provider environment 103 issues a credential to the trouble ticket representative and the representative uses the credential to access the customer's computing resource.

In an embodiment where the trouble ticket service 112 is part of the service provider environment 103, the operation flow may be substantially the same as that described above. One difference may be that the internal trouble ticket representatives could log directly into the user identification and authentication service 144 instead of going through the ticketing service 112.

Possible use cases of the access control module 145 are when the trouble ticket representative helps the user solve a problem related to a configuring a virtual network, a virtual machine on the virtual network, a storage service, etc. In the instance where the user needs help with a website, the trouble ticket representative would be provided a web browser cookie that includes state that allows the trouble ticket representative to go to the website and be logged in as if the representative was the user. Alternatively, the trouble ticket representative may be provided a credential that allows the trouble ticket representative to log into the website as impersonating the user. Therefore, referring back to FIG. 2, after being granted permission, the technical support representative may log in 203 as himself or herself, be authenticated, and request to impersonate the customer.

In the third-party support case for one embodiment, the representative logs into his or her ticketing service 162, not the user identification and authentication service 144. The ticketing service 162 sends a request to the user identification and authentication service 144 to request entry. The access control module 145 checks to see if it should grant the ticketing service's request by looking at a policy associated with the user and by determining if the user has authorized the support. Optionally, if the user has not granted the support yet, a signal may be sent to the user or customer to authorize the support. Then, access control module 145 uses the policy to determine how to scope the rights of the trouble ticket representative.

As discussed previously, the access control module 145 can also use information from the ticketing service to scope the rights of the trouble ticket representative even further. For example, the ticketing service may tell the access control module 145 that the representative is only working for the next two hours and ask that representative only be allowed to impersonate for the next two hours.

In FIG. 2, before granting the request, the user identification and authentication service 144 verifies 204 that the requesting representative is permitted to impersonate the customer. Accordingly, a policy attached to the representative or attached to a group in which the representative is a member may be present that specifies that the representative is allowed to impersonate the customer. The particular policy may specify the customer to whom it applies and may also specify a duration for the policy. Thus, a linkage exists between the customer that is subject to the policy, the user(s) to whom the policy is attached or associated, and a term or duration of the policy which could be linked to a triggering event. For example, a permission may be granted as long as a trouble ticket is outstanding. Accordingly, when the trouble ticket is closed then the term of the permission may be terminated.

Once the customer has granted permission, access control module 145 is updated to attach a policy to the representative indicating that the support representative has permission to impersonate the customer. The policy may also express the parameters and limitations of the access rights. In some embodiments, the support representative logs in 203 to user identification and authentication service 144. Also, the service 144 may generate a credential that the trouble ticket representative can use to temporary log into the user's account.

The user identification and authentication service 144 authenticates the support representative's login credentials and verifies 204 whether the authenticated representative has permission to impersonate the identified user and access 205 the user data. If the customer does not explicitly grant to the representative the necessary permission to allow for impersonation of the customer, then the representative will be denied 206 the impersonation request. Modifications, such as a rearrangement and/or omission of operations, of the described method are within the scope of the present disclosure.

To grant impersonation permissions, in one embodiment, the user identification and authentication service 144 may have a management software tool for granting a permission to a technical support group or representative. For example, the tool may provide a graphical interface checkbox that can be selected by a user to opt-in to granting the permission or the user could be prompted to choose to grant a permission after submitting a technical support request or ticket with it being stated that the permission lasts as long as technical support is being provided to address the issue related to the original request or support ticket. In one embodiment, a third-party support group or entity 160 not directly associated or affiliated with the network-based resource may be enlisted by the user to provide technical support and thereby be granted a permission by the user to access the user data and be provided the necessary access rights to allow the third-party to utilize the network-based resource in a manner consistent with the user's access rights and restrictions. Accordingly, if the user has not pre-authorized a grant of permission to access the user data, a request by a support representative will be denied. Further, the permission term may be set or scheduled to automatically expire after a specified period or after a designated event has occurred. Therefore, at some point, the grant of permission expires. In various embodiments, expiry can take place when any of the following events occur: after a predetermined time period has elapsed, or some other time period that is preset or selectable by the user; upon explicit command by the user to terminate the grant; or upon any combination of the above.

Expiry of the grant ensures that, once the troubleshooting task has been completed, user data remains secure. In addition, the use of the grant of permission as described above allows the support representative to access user data for diagnostic purposes, without requiring the user to provide his or her personal login credentials to the representative and thereby compromise the security of user data. The particular mechanism used to grant a permission may depend on the particulars of the network-based resource and/or access control module 145. In general, the grant will be a user or customer mediated grant, and the application or network provider can choose what mechanisms to use to accept that granted permission. The provider uses that permission as a measure of control on the ability of the entity that receives the grant ("grantee") to access the user data.

For one embodiment, FIG. 3 depicts a table 310 that specifies access rights associated with entities that have been granted permission rights. The figure is representative of one example of a possible embodiment used to effectuate authentication and authorization services. As a non-limiting example, a Lightweight Directory Access Protocol (LDAP) server accessible over the Internet may be used.

In particular, each data row 312d-312j in the table indicates a named grantee (e.g., an entity that has been granted a right to impersonate or access the user data of another user) in column 312a that is authorized to initiate an impersonation action to an entity ("grantor") named in column 312b. In addition, grantees may be identified in different manners in the present example, including by individual name or by group name. For example, row 312e indicates that members of Group1 may initiate impersonation actions to an entity identified as User2. Therefore, the grant may apply to any member of the indicated group or of any sub-groups of the indicated group. Hence, User2 may grant Group1 the permission or right to impersonate User2 and management for Group1 may then select which member is tasked to provide support to User2.

Row 312f shows that a grantee identified as User1 may initiate impersonation actions involving the entity identified as User3. Further, in accordance with various scenarios that have been described for illustrative purposes, row 312g shows a third-party support entity 160 ("Bob's Tech Support") being granted permission to impersonate User4. Also, in rows 312h and 312i, User4 has also granted impersonation permission to an internal support service ("SP Tech Support") and to an administrator ("Admin") of the service provider environment 103. Row 312j indicates that additional grantees and grantors may be identified, as needs arise.

Column 312c indicates that additional information may be specified with respect to access policies (e.g., policy expiration criteria, contact information for the user that created or otherwise manages the policy, business justification, subsets of user data or applications that are allowed to be accessed under the grant, etc.). For example, support and/or business justification reasons may be documented. Further, in some embodiments, instead of specifying usernames, source network addresses for entities may be used.

Figure 4:
FIGS. 4-5, 7, and 9-12 are drawings of exemplary user interfaces rendered by a client device in the data communications network environment of FIG. 1 according to various embodiments of the present disclosure.
Figure 5:
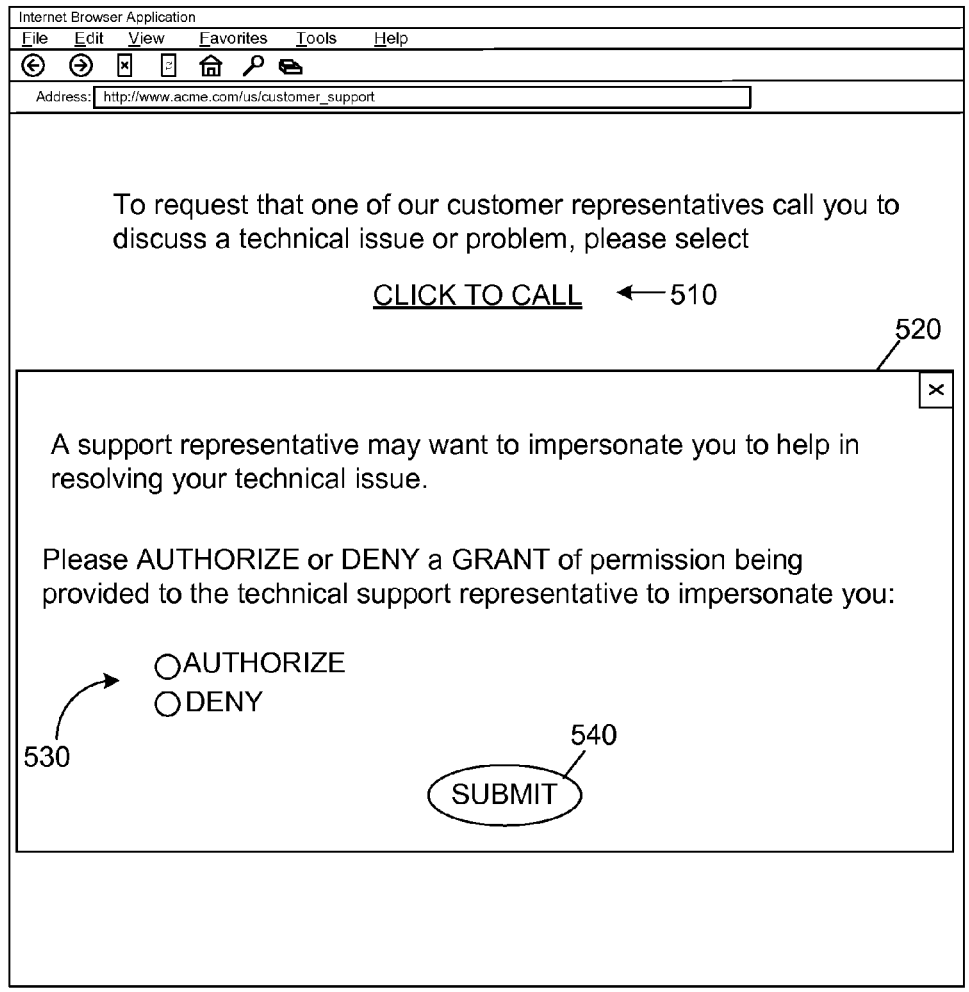
Figure 6:
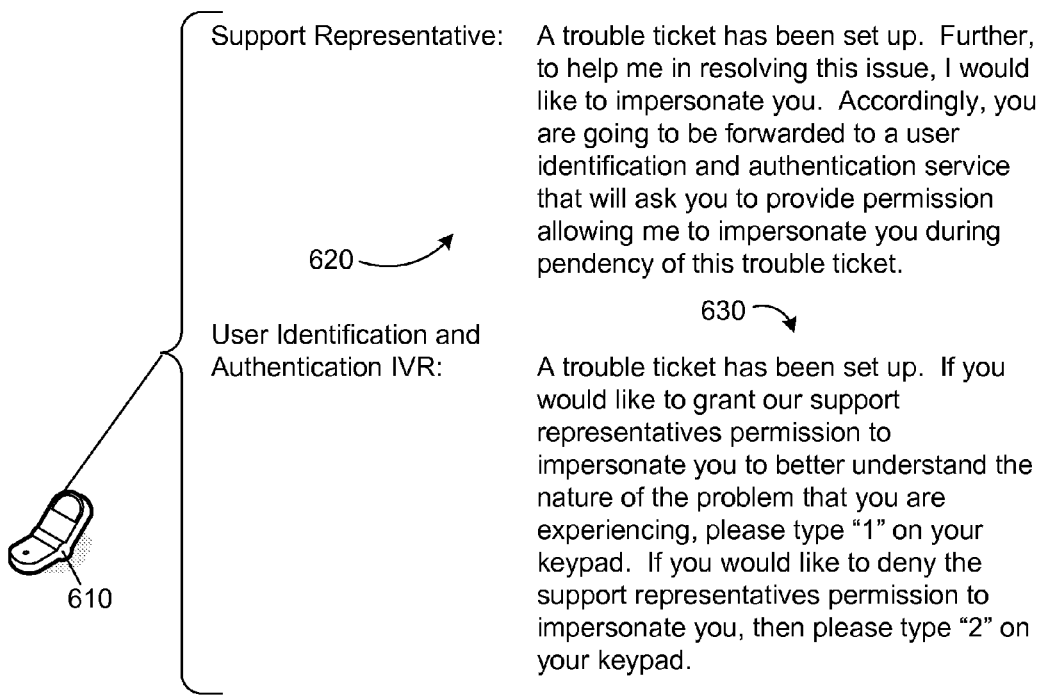
FIGS. 6 and 8 are drawings of exemplary voice communications rendered by a client device in the data communications network environment of FIG. 1 according to various embodiments of the present disclosure.

As stated above, the particular mechanism used to grant a permission may depend on the particulars of the network-based resource and/or access control module 145 (FIG. 1). In one exemplary representation, as depicted in FIG. 4, a web communication may provide a dialog box or popup 410 that prompts a user to authorize or deny a request to grant permission by selecting the appropriate response from a dropdown menu 420 and selecting a submit button 430. Alternatively, in FIG. 5, a user may select a CLICK TO CALL option 510 on a web page requesting for technical support and then be provided a dialog box 520 prompting the user to authorize or deny a request to grant permission by selecting the appropriate response from a choice of radio buttons 530 and selecting a submit button 540. Similarly, during voice communications, a user may also be prompted to grant a permission. For example, in FIG. 6, a conversation may take place via telephone 610 between a support representative and a user, where the support representative requests for permission to impersonate the user (as indicated by pointer 620) and triggers activation of an automated interactive voice response system (e.g., via opening of a trouble ticket) that asks for the user to authorize or deny the grant of permission to the support representative (as indicated by pointer 630). In some embodiments, the automated interactive voice response system may be triggered from a web communication and may call out to a listed number for an account of the user to attempt to receive the desired authorization. In each of these examples, input from the user is needed before impersonation can be authorized to be carried out by the support representative.

Figure 7:
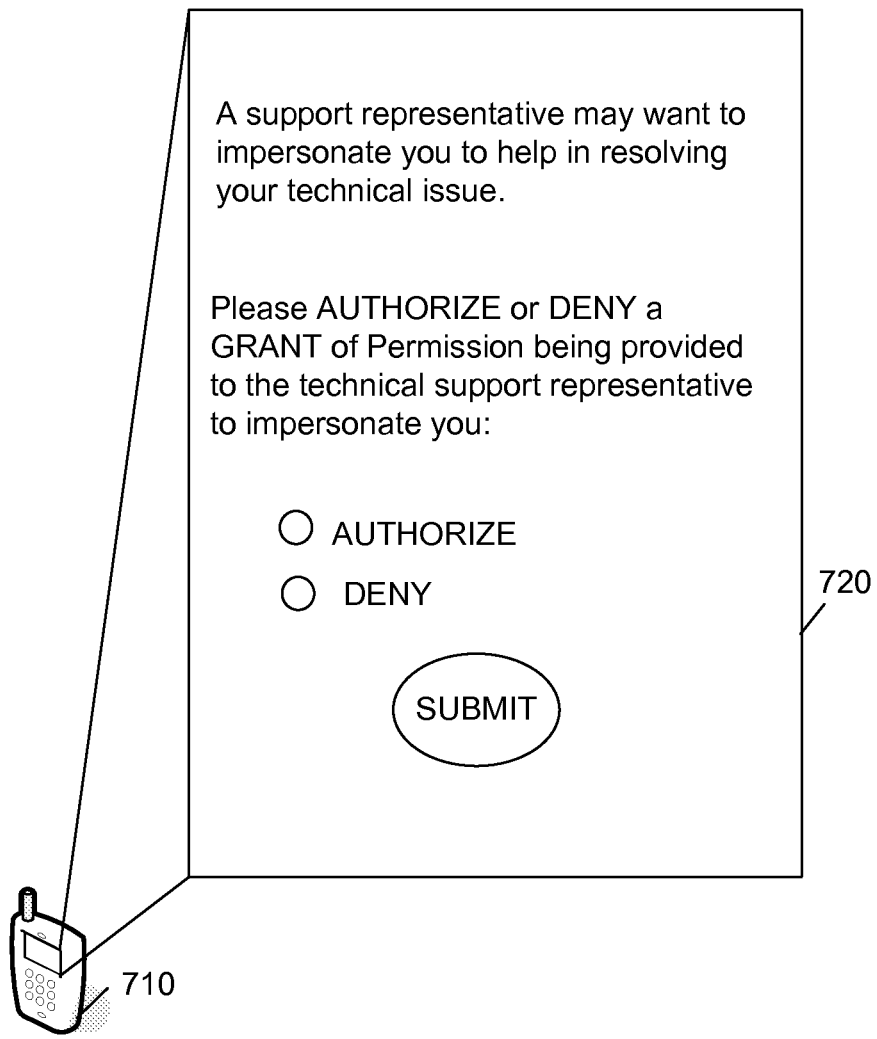
Figure 8:
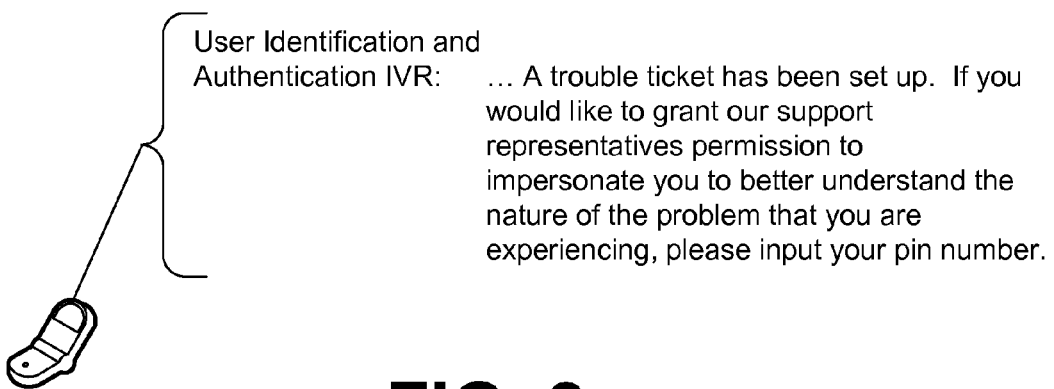
Figure 9:
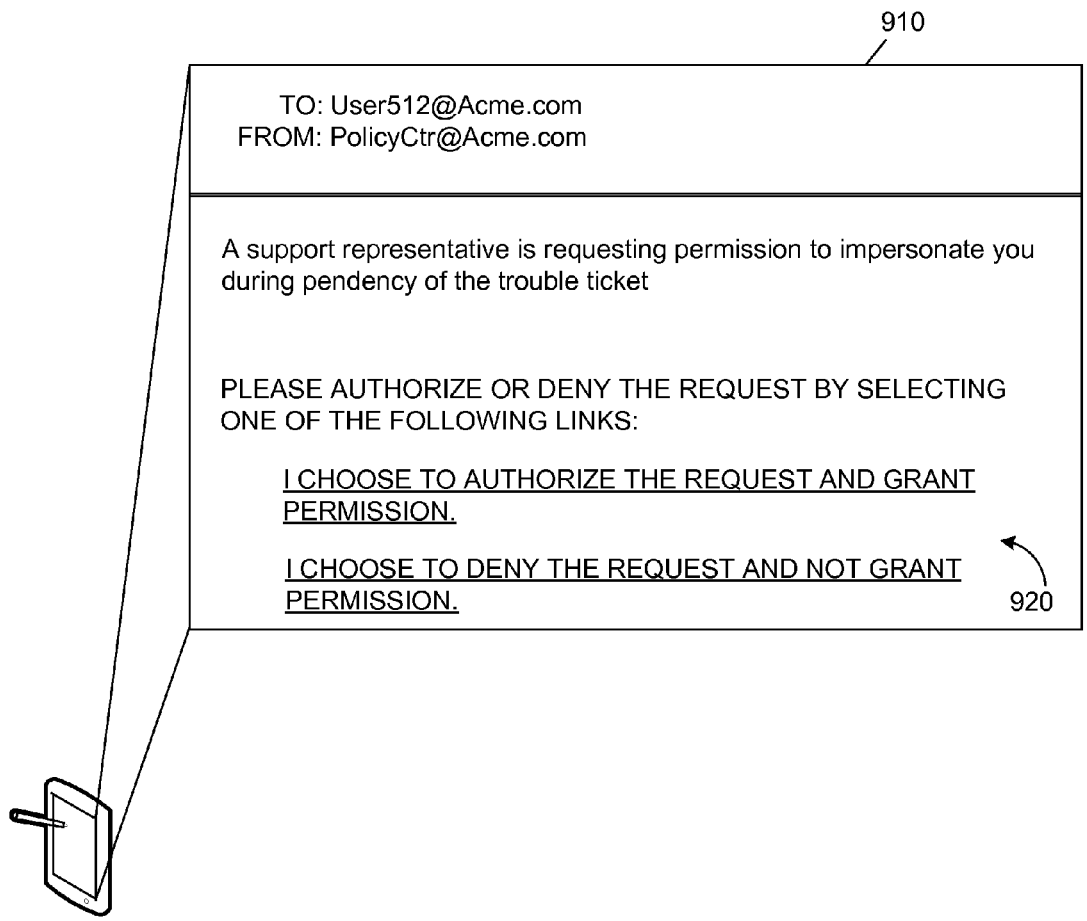

In another illustrative example, a request can be received on a smartphone device 710, tablet, etc., as depicted in FIG. 7. For example, a mobile phone application may display a prompt screen 720 to the user requesting the user to authorize the permission grant. In some embodiments, the user may input a unique pin or code to indicate his or her authorization for the requested permission grant, as depicted in FIG. 8. Further, in some embodiments, the user may receive an email message 910 from the support representative or the access control module 145 (FIG. 1) requesting the user to designate whether the user authorizes a permission grant (e.g., via selection of an appropriate hypertext link 920), as shown in FIG. 9.

Figure 10:
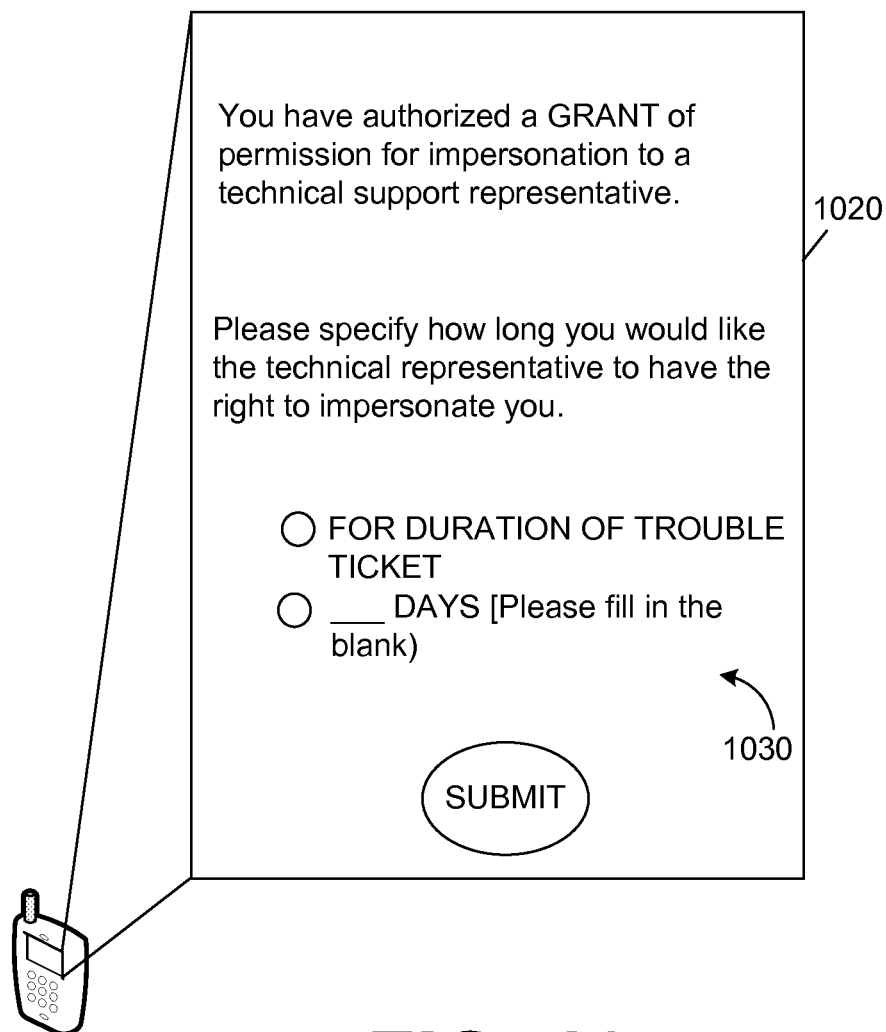

In many of the foregoing examples, the duration of the permission grant is stated to be tied to a trouble ticket for a support case. However, duration of the permission grant may also be specifically defined. As an example, in FIG. 10, a prompt screen 1020 (which could possibly follow prompt screen 720 in FIG. 7) requests the user to specify a duration for the permission grant, where the user may input the number of days that the grant is to exist before expiring (as indicated by pointer 1030). Additional prompts may also be presented to a user in various embodiment. For instance, a user may be presented with options to limit the scope of impersonation rights to be granted. Therefore, the user, such as customer, may choose whether to grant a technical support representative full or limited impersonation rights, in one embodiment. Also, impersonation rights may be granted to an intermediate entity or principal, such as a customer support management member that can delegate or a programmed computing device configured to delegate the granted impersonation right to an individual technical support representative. In this scenario, the intermediate entity or principal may be able to choose whether to limit the scope of the rights granted by the customer. As an example, if a customer is having an issue with a particular remote computing service or web service, such as an email service, in a cloud computing environment or platform, the technical support representative tasked to provide technical support may not be granted access to all of the user's data and all of the web services to which the user is provided access. Rather, the representative may be granted impersonation rights with respect to email-related data.

Accordingly, a web services request accompanied with a signed credential of the representative declaring that the representative is acting on behalf of the user may be granted (after verifying that the representative is authorized to act on behalf of the user with respect to email services) and a calendar request accompanied with a signed credential declaring that the representative is acting on behalf of the user may be denied (after failing to verify that the representative is authorized to act on behalf of the user with respect to calendar services).

Figure 11:
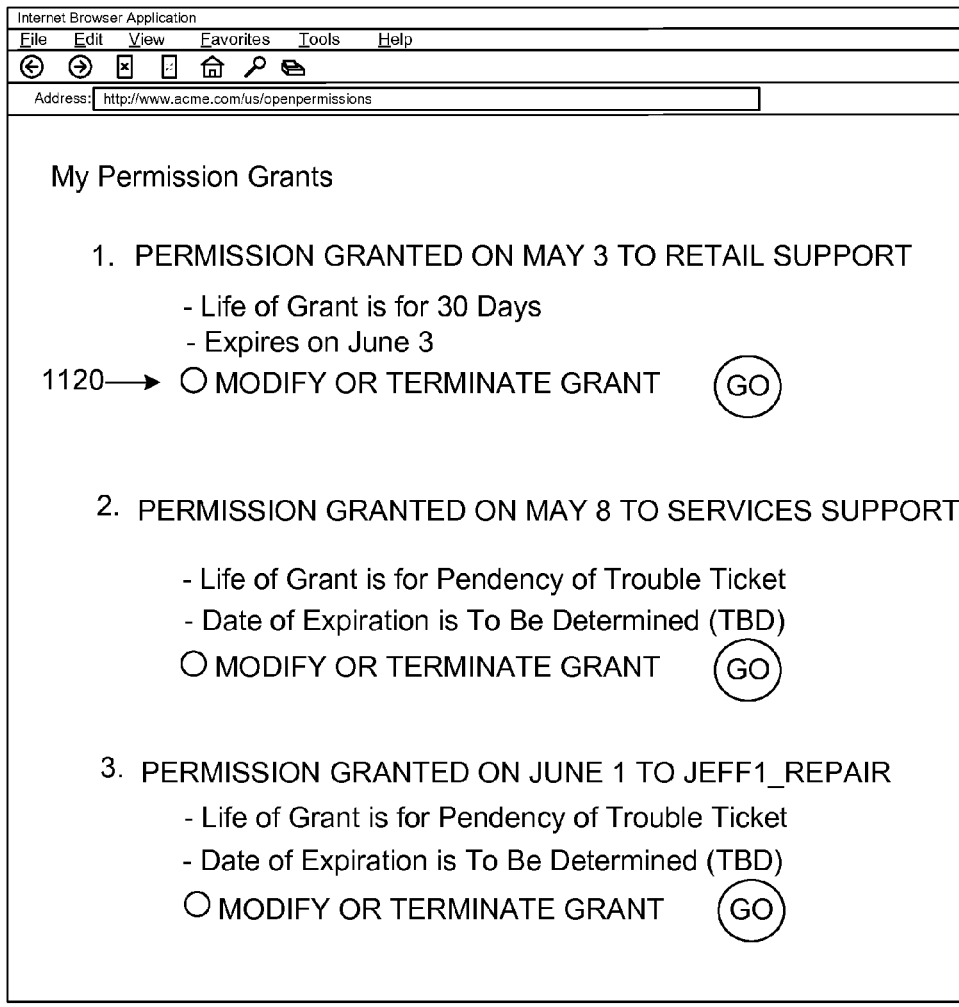

In order to track such grants of permissions, embodiments may also provide a user interface allowing a user to view what permission grants are outstanding by the user ("My Permission Grants"), as shown in FIG. 11. For example, some embodiments may provide an interactive console (e.g. a client application program providing an interactive user interface, a web browser-based interface, etc.) from which users can manage access policies or group membership. In addition, some embodiments may provide an API (application programming interface) that allows other computing systems and programs to programmatically invoke such functionality. Such APIs may be provided by libraries or class interfaces (e.g., to be invoked by programs written in C, C++, or Java) and/or network service protocols such as via web services.

Figure 12:
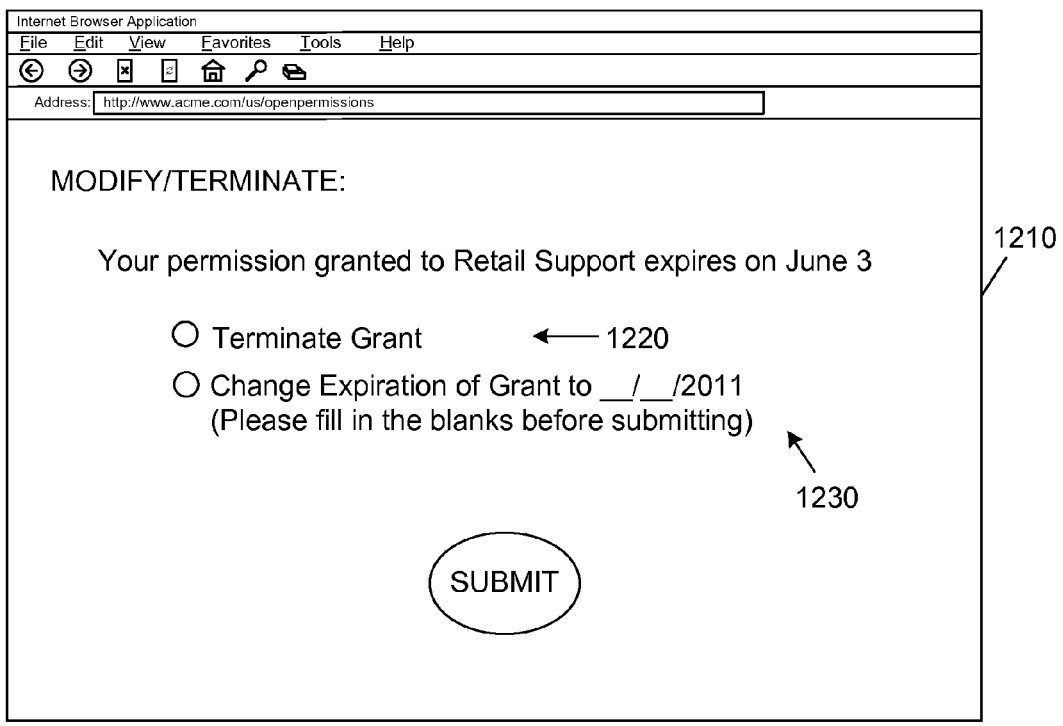

In FIG. 11, a web page 1110 is shown listing three permission grants for the user. Under each of the three permission grants, information on the term of the permission grant is stated and an option is provided to modify the term or to terminate the term (and thereby remove the permission grant from the party to which it was granted). For example, for the first permission grant listed, the permission grant is to "Retail Support" group and is set to expire on June 3rd. To modify or terminate the term of the permission grant, an option 1120 is provided that can be selected. After selection of the option 1120, the user may be provided an additional web page 1210, as shown in FIG. 12. Here, the user can specify whether the term should be terminated, as indicated by option 1220, or whether the term should be changed, as indicated by option 1230. For option 1230, the user can input an end-date for the term (at which the grant of permission should expire).

Figure 13:
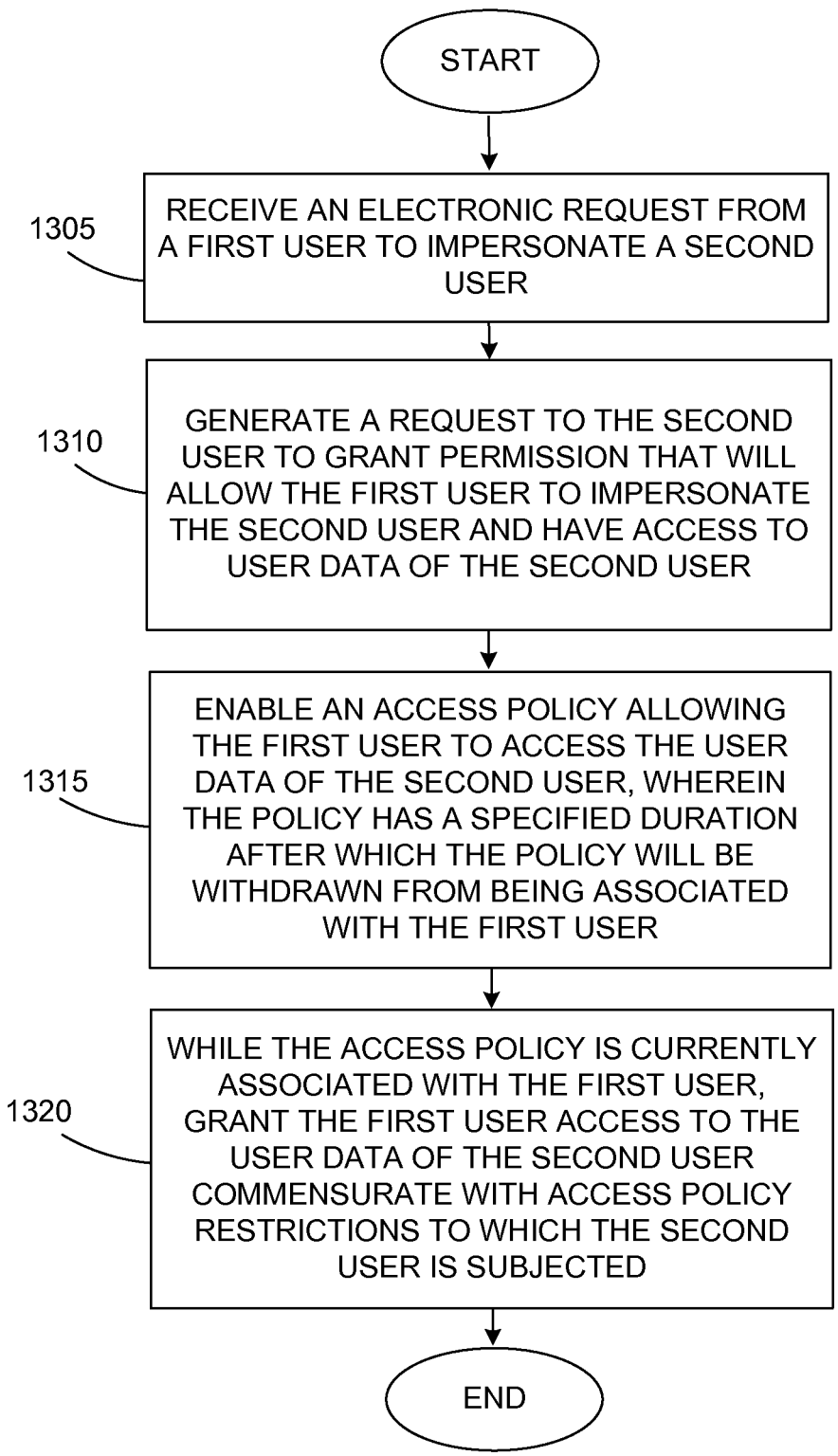
FIGS. 13-15 are flowcharts illustrating various examples of functionality implemented as portions of an access control module executed in a computing device in the data communications network environment of FIG. 1 according to various embodiments of the present disclosure.

Referring next to FIG. 13, shown is a flowchart that provides one example of the operation of a portion of the access control module 145 (FIG. 1) according to various embodiments. It is understood that the flowchart of FIG. 13 provides merely an example of the many different types of functional arrangements that may be employed to implement the operation of the portion of the access control module 145 as described herein. As an alternative, the flowchart of FIG. 13 may be viewed as depicting an example of steps of a method implemented in the computing device 103 (FIG. 1) according to one or more embodiments.

In box 1305, the access control module 145 of service provider environment 103 receives an electronic request from a first user to impersonate a second user. In one exemplary scenario, the first user may be a customer support representative that is attempting to resolve a technical issue being experienced by the second user, where the problems being encountered by the second user may be more readily observed by the customer support representative if the representative is allowed to impersonate the second user. According to various embodiments, the first user may be affiliated with a host to the virtual network or be affiliated with a third-party consulting entity (e.g., trouble ticketing support entity 160) that is not the hosting provider. Therefore, in box 1310, the access control module 145 generates a request to the second user to grant permission that will allow the first user to impersonate the second user and have access to user data of the second user.

In box 1315, in response to receiving an indication that the permission is granted by the second user, the access control module 145 enables an access policy configured to allow the first user to access the user data of the second user, wherein the policy has a specified duration after which the policy will be withdrawn from being associated with the first user. Accordingly, in box 1320, while the policy is currently associated with the first user, the access control module grants the first user access to the user data of the second user commensurate with access policy restrictions to which the second user is subjected. In a non-limiting example, credentials of the second user (e.g., username, password, etc.) are used to check whether access policies authorize the first user to act on behalf of the second user and authorize the first user (in an impersonation of the second user) access the user data of the second user.

Figure 14:
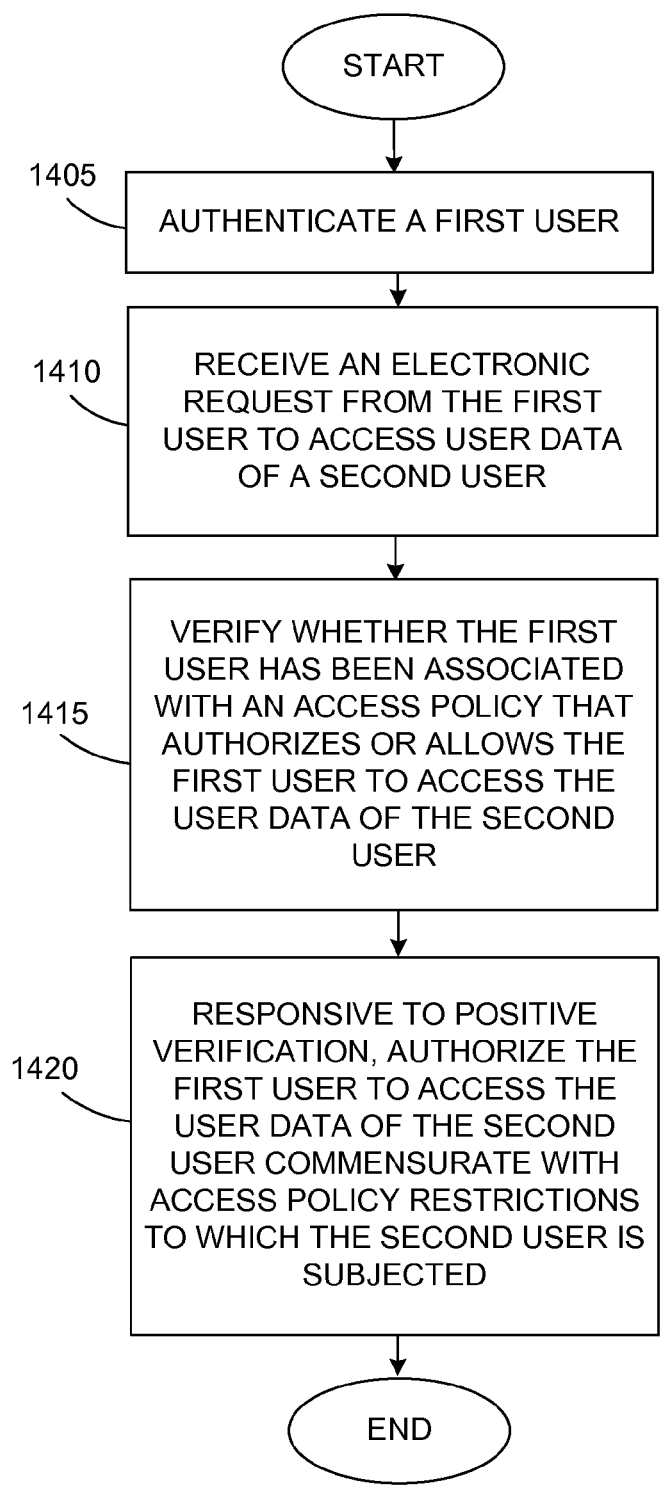

Referring next to FIG. 14, shown is a flowchart that provides another example of the operation of a portion of the access control module 145 (FIG. 1) according to various embodiments. It is understood that the flowchart of FIG. 14 provides merely an example of the many different types of functional arrangements that may be employed to implement the operation of the portion of the access control module 145 as described herein. As an alternative, the flowchart of FIG. 14 may be viewed as depicting an example of steps of a method implemented in the service provider environment 103 (FIG. 1) according to one or more embodiments.

In box 1405, the user identification and authentication module 144 (FIG. 1) of service provider environment 103 authenticates a first user. For example, the first user may provide credentials (e.g., unique username and password combination) that match stored credentials maintained by the user identification and authentication module 144. The access control module 145 of service provider environment 103 then receives an electronic request from the first user to access user data of a second user, in box 1410. The request may be forwarded to the access control module 145 from another receiving node so that the access control module 145 can evaluate the request and determine whether the request should be granted. In box 1415, in response to receiving the electronic request, the access control module 145 verifies whether the first user has been associated with an access policy that authorizes or allows the first user to access the user data of the second user. In one embodiment, such an access policy may have a specified duration after which the policy will be withdrawn from being associated with the first user.

Next, in box 1420, in response to verifying that the first user has been associated with a policy allowing the first user to access the user data of the second user, the access control module 145 authorizes or allows the first user (e.g., grants the request) to access the user data of the second user commensurate with access policy restrictions to which the second user is subjected. For example, if the second user is not authorized to perform a particular action, then the first user, while impersonating the second user, will also not be authorized to perform the particular action.

Figure 15:
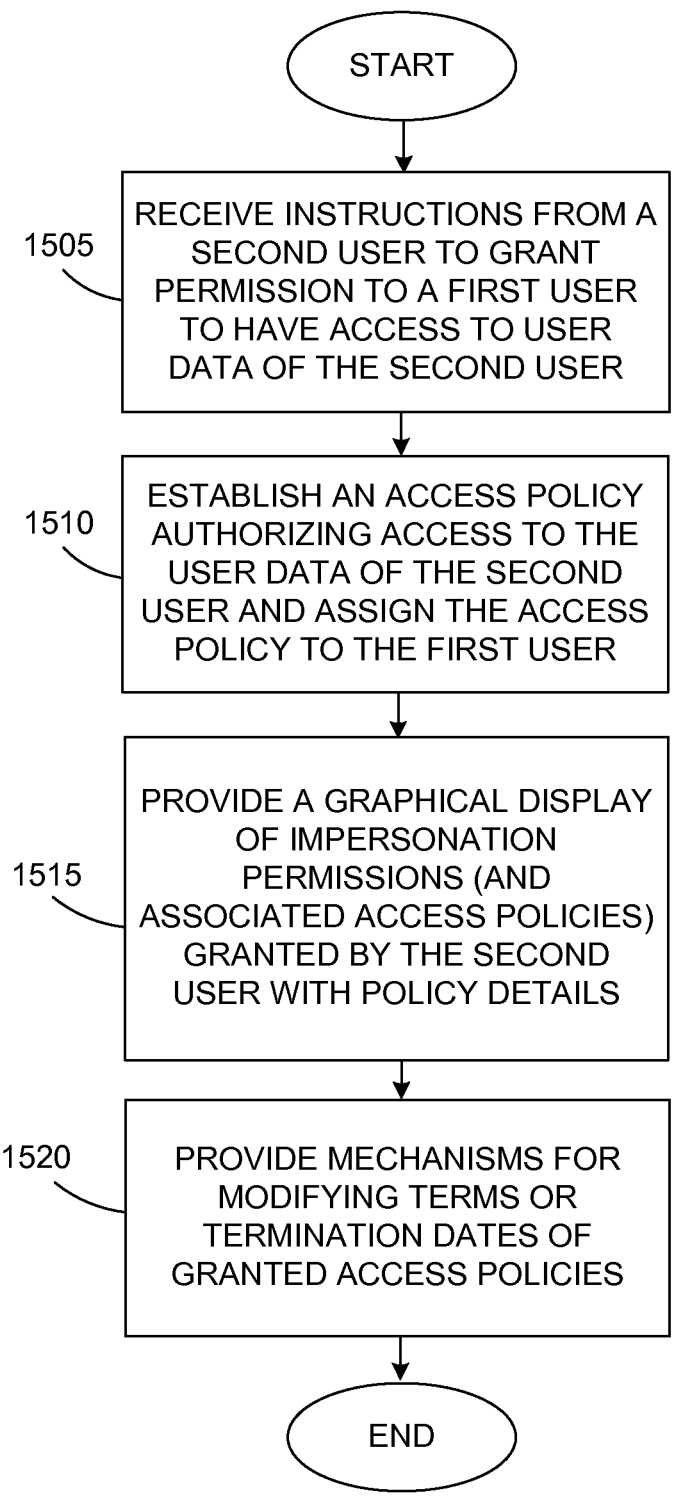

Referring next to FIG. 15, shown is a flowchart that provides another example of the operation of a portion of the access control module 145 (FIG. 1) according to various embodiments. It is understood that the flowchart of FIG. 15 provides merely an example of the many different types of functional arrangements that may be employed to implement the operation of the portion of the access control module 145 as described herein. As an alternative, the flowchart of FIG. 15 may be viewed as depicting an example of steps of a method implemented in the service provider environment 103 (FIG. 1) according to one or more embodiments.

In box 1505, the access control module 145 of service provider environment 103 receives instructions from a second user to grant permission to a first user to have access to user data of the second user. In other words, the second user is granting impersonation permission to the first user. Therefore, in box 1510, the access control module 145 establishes an access policy authorizing access to the user data of the second user and assigns the policy to the first user, such that a request from the first user to access the second user's data will be checked against each assigned policy of the first user. Correspondingly, in box 1515, the access control module 145 provides a graphical display of impersonation permissions (and associated policies) granted by a user, such as the second user, with policy details including dates or descriptions of termination for each respective permission/policy. In box 1520, the access control module 145 may further provide mechanisms for modifying terms or termination dates of granted policies, including an option to terminate upon command. For example, the second user may decide to withdraw the first user's right to impersonate the second user and may be provided a graphical user interface "Terminate" button that upon selection will proceed to withdraw the policy allowing the first user to impersonate the second user. In one embodiment, a computing device of the service provider environment 103 encodes for display on a display device the various graphical interfaces described above.

Figure 16:
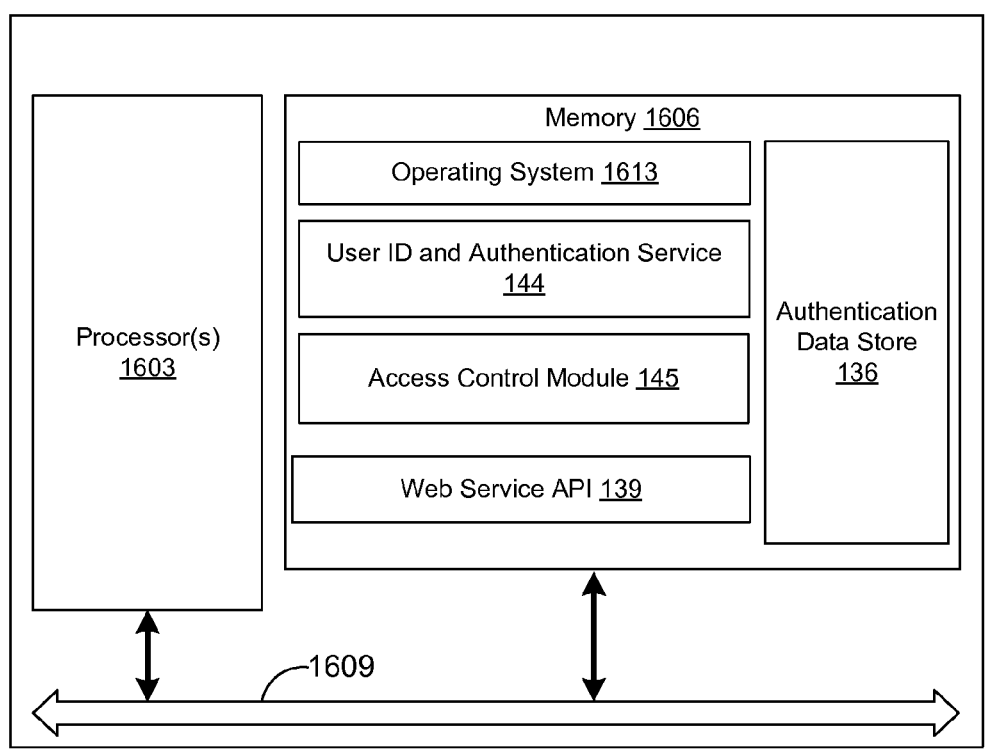
FIG. 16 is a schematic block diagram that provides one example illustration of a computing device employed in the data communications network environment of FIG. 1 according to various embodiments of the present disclosure.

With reference to FIG. 16, shown is a schematic block diagram of a computing device of the service provider environment 103 according to an embodiment of the present disclosure. The computing device of the service provider environment 103 includes at least one processor circuit, for example, having a processor 1603 and a memory 1606, both of which are coupled to a local interface 1609. To this end, the service provider environment 103 may comprise, for example, at least one server computer or like device. The local interface 1609 may comprise, for example, a data bus with an accompanying address/control bus or other bus structure as can be appreciated.

Stored in the memory 1606 are both data and several components that are executable by the processor 1603. In particular, stored in the memory 1606 and executable by the processor 1603 are the access control module 145, and potentially other applications, such as user identification and authentication service 144. Also stored in the memory 1606 may be data store(s) 136 and other data. In addition, an operating system 1613 may be stored in the memory 1606 and executable by the processor 1603 and network interface application(s) 139 may be used to communicate using network protocols.

It is understood that there may be other applications that are stored in the memory 1606 and are executable by the processors 1603 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 1606 and are executable by the processor 1603. In this respect, the term "executable" means a program file that is in a form that can ultimately be run by the processor 1603. Examples of executable programs may be, for example, a compiled program that can be translated into machine code in a format that can be loaded into a random access portion of the memory 1606 and run by the processor 1603, source code that may be expressed in proper format such as object code that is capable of being loaded into a random access portion of the memory 1606 and executed by the processor 1603, or source code that may be interpreted by another executable program to generate instructions in a random access portion of the memory 1606 to be executed by the processor 1603, etc. An executable program may be stored in any portion or component of the memory 1606 including, for example, random access memory (RAM), read-only memory (ROM), hard drive, solid-state drive, USB (Universal Serial Bus) flash drive, memory card, optical disc such as compact disc (CD) or digital versatile disc (DVD), floppy disk, magnetic tape, or other memory components.

The memory 1606 is defined herein as including both volatile and nonvolatile memory and data storage components. Volatile components are those that do not retain data values upon loss of power. Nonvolatile components are those that retain data upon a loss of power. Thus, the memory 1606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1603 may represent multiple processors 1603 and the memory 1606 may represent multiple memories 1606 that operate in parallel processing circuits, respectively. In such a case, the local interface 1609 may be an appropriate network 109 (FIG. 1) that facilitates communication between any two of the multiple processors 1603, between any processor 1603 and any of the memories 1606, or between any two of the memories 1606, etc. The local interface 1609 may comprise additional systems designed to coordinate this communication, including, for example, performing load balancing. The processor 1603 may be of electrical or of some other available construction.

Although the network-based resource and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 13-15 show the functionality and operation of an implementation of portions of the access control module 145. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1603 in a computer system or other system. The machine code may be converted from the source code, etc. If embodied in hardware, each block may represent a circuit or a number of interconnected circuits to implement the specified logical function(s).

Although the FIGS. 13-15 show a specific order of execution, it is understood that the order of execution may differ from that which is depicted. For example, the order of execution of two or more blocks may be scrambled relative to the order shown. Also, two or more boxes shown in succession in FIGS. 13-15 show may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network-based resource, that comprises software or code can be embodied in any computer-readable medium for use by or in connection with an instruction execution system such as, for example, a processor 1603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Therefore, the following is claimed:

1. A non-transitory computer-readable medium embodying a program executable in a computing device, the program comprising:

code that receives a request to open a trouble ticket for a technical problem cited by a user;

code that receives an indication of a permission granted for authorizing a trouble ticket representative to impersonate the user during pendency of the trouble ticket;

code that receives an identification of the trouble ticket representative that is to impersonate the user during the pendency of the trouble ticket from a trouble ticket intermediate entity, wherein a granting of the permission by the user enables activation of an access policy authorizing the trouble ticket representative to impersonate the user, wherein the impersonation of the user by the trouble ticket representative is subject to at least access policy restrictions of the user;

code that receives an electronic request from the trouble ticket representative to act as the user and to access user data of the user on behalf of the user;

code that verifies whether the trouble ticket representative is authorized to impersonate the user;

code that grants the electronic request to act as the user and to access the user data of the user commensurate with the access policy restrictions to which the user is subjected by issuing an authentication cookie to the trouble ticket representative that identifies the trouble ticket representative as acting on behalf of the user, wherein the authentication cookie specifies usernames of the trouble ticket representative and the user; and code that encodes for display a graphical interface showing a subset of impersonation permissions granted by the user to at least one other user, the subset of impersonation permissions including the access policy that authorizes the trouble ticket representative to impersonate the user.

2. The non-transitory computer-readable medium of claim 1, wherein the permission is automatically revoked when the trouble ticket is closed.

3. The non-transitory computer-readable medium of claim 1, further comprising code than enables the trouble ticket intermediate entity to reassign a grant of permission to impersonate the user to a different trouble ticket representative.

4. The non-transitory computer-readable medium of claim 1, wherein a prompting of the user to grant the permission to authorize the trouble ticket representative to impersonate the user is provided in a form of at least one of an email message sent to the user; a dialog box provided during a web session; an interface to a mobile application; and an interactive voice response message provided during voice communications.

5. A system, comprising:
   at least one processor; and
   at least one memory comprising instructions that upon execution cause the system to:
      receive an electronic request from a first user of a service provider to act as a second user of a service provider and to access user data of the second user on behalf of the second user;
      verify whether the first user is subject to an access policy that authorizes the first user to impersonate the second user, wherein the access policy was specifically granted by the second user;
      authorize the first user to impersonate the second user commensurate with access policy restrictions to which the second user is subjected by issuing an authentication cookie to the first user that identifies the first user as acting on behalf of the second user, wherein the authentication cookie specifies usernames of the first user and the second user; and
      encoding for display a graphical interface showing a subset of impersonation permissions granted by the second user to at least one other user, the subset of impersonation permissions including the access policy that authorizes the first user to impersonate the second user.

6. The system of claim 5, wherein the first user comprises a representative of a technical support department of the service provider.

7. The system of claim 5, further comprising a technical support trouble ticket computer system that receives a request to open a trouble ticket for a technical problem cited by the second user and prompts the second user to grant a permission to authorize the first user to impersonate the second user during pendency of the trouble ticket being serviced by the first user, wherein responsive to receiving an indication that the permission is granted by the second user, a request is generated to create the access policy that authorizes the first user to impersonate the second user, wherein the access policy is automatically revoked when the trouble ticket is closed.

8. The system of claim 7, wherein prompting of the second user to grant the permission to authorize the first user to impersonate the second user is in a form of an email message sent to the second user, a dialog box provided during a web session, an interface to a mobile application, or an interactive voice response message provided during voice communications.

9. The system of claim 7, wherein the user data comprises user account information used to access a computer application being serviced by the first user, wherein the first user is denied access to the user account information of the second user when the second user does not grant the permission.

10. The system of claim 5, the instructions further causing the system to:
    prompt the second user to designate a period after which the access policy is to be automatically revoked; and
    provide a mechanism for the second user to terminate, upon command, the access policy.

11. The system of claim 5, wherein the access policy is directly associated with a group of users of which the first user is a member, wherein the access policy allows for each of the users in the group to impersonate the second user.

12. The system of claim 5, wherein the access policy is individually and directly associated with the first user.

13. The system of claim 5, wherein the first user is an intermediate user that delegates to at least one other user a right to impersonate the second user.

14. The system of claim 5, further comprising a multitenant virtual network system, wherein the first user and the second user are tenants to the multitenant virtual network system and the user data comprises user account information for the multitenant virtual network system.

15. A method comprising:
    receiving, by at least one computing device, instructions from a second user to grant an impersonation permission to a first user to act as the second user and to access user data of the second user on behalf of the second user, wherein the impersonation permission is automatically revoked upon occurrence of a defined condition without further action by the second user;
    establishing, by the at least one computing device, an access policy authorizing impersonation of the second user by the first user, wherein the impersonation of the second user by the first user is subject to at least access policy restrictions of the second user;
    encoding for display, by the at least one computing device, a graphical interface showing a subset of impersonation permissions granted by the second user to at least one other user, the subset of impersonation permissions including the access policy that authorizes the first user to impersonate the second user;
    issuing an authentication cookie to the first user that identifies the first user as acting on behalf of the second user by specifying usernames of the first user and the second user;
    detecting occurrence of the defined condition; and
    upon detection of the defined condition, automatically revoking the impersonation permission, where after revocation, the first user is denied a right to impersonate the second user.

16. The method of claim 15, wherein the defined condition comprises at least one of surpassing a maximum amount of users of the access policy, expiration of a time limit in which to use the access policy, a resolution of an outstanding issue that the second user requested the first user to address, completion of a repair of a network outage problem, surpassing a maximum number of access failures by the first user, or occurrence of the first user being off-duty in accordance with a work schedule of the first user.

17. The method of claim 15, further comprising encoding for presenting on a client device of the second user at least a subset of impersonation permissions previously granted by the second user, the at least a subset of impersonation permissions including details of the access policy associated with the first user.

18. The method of claim 17, further comprising encoding for presenting on a client device of the second user at least one option to modify a scheduled expiration date for at least one of the impersonation permissions currently being presented.

19. The method of claim 15, further comprising:
   prompting the second user to authorize the first user to impersonate the second user; and
   issuing the instructions to grant the impersonation permission to the first user to act as the second user and to access the user data of the second user on behalf of the second user.

20. The method of claim 15, wherein the user data comprises user account information used to access a computer application being serviced by the first user and wherein the first user is denied access to the user account information of the second user when the second user does not grant the impersonation permission.

21. The method of claim 15, wherein the user data comprises user account information used to access a computer application being serviced by the first user and the access policy is directly assigned to a group of users of which the first user is a member, wherein the access policy allows for each of the users in the group to impersonate the second user.

22. The method of claim 21, wherein the first user is authenticated to the computer application using credentials uniquely assigned to the first user and, after the first user is authenticated and verified to have authority to impersonate the second user, a web service request from the first user identifies that the web service request is from the first user on behalf of the second user.

23. The method of claim 15, wherein the first user is a third-party provider of support services with respect to a network service provided to the second user to which the second user is experiencing a technical problem.

* * * * *